United States Patent
Severac et al.

(10) Patent No.: US 10,318,143 B2
(45) Date of Patent: Jun. 11, 2019

(54) METHOD OF MANUFACTURING A TRANSPARENT TACTILE SURFACE AND TACTILE SURFACE OBTAINED BY SUCH A METHOD

(71) Applicant: NANOMADE CONCEPT, Toulouse (FR)

(72) Inventors: Fabrice Severac, Toulouse (FR); Celine Christophe, Auterive (FR); Marie-Laure Pourciel-Gouzy, Toutens (FR)

(73) Assignee: NANOMADE CONCEPT, Toulouse (FR)

( * ) Notice: Subject to any disclaimer, the term of this patent is extended or adjusted under 35 U.S.C. 154(b) by 728 days.

(21) Appl. No.: 14/417,499

(22) PCT Filed: Jul. 28, 2013

(86) PCT No.: PCT/EP2013/065857
§ 371 (c)(1),
(2) Date: Jan. 26, 2015

(87) PCT Pub. No.: WO2014/016429
PCT Pub. Date: Jan. 30, 2014

(65) Prior Publication Data
US 2015/0205481 A1    Jul. 23, 2015

(30) Foreign Application Priority Data

Jul. 27, 2012  (FR) ..................................... 12 57340

(51) Int. Cl.
*C08J 5/04*     (2006.01)
*G06F 3/0488*   (2013.01)
(Continued)

(52) U.S. Cl.
CPC ............. *G06F 3/0488* (2013.01); *B05D 1/18* (2013.01); *B05D 3/007* (2013.01); *B82Y 10/00* (2013.01);
(Continued)

(58) Field of Classification Search
CPC combination set(s) only.
See application file for complete search history.

(56) References Cited

U.S. PATENT DOCUMENTS 5,772,916 A * 6/1998 Jamil ................. C09K 11/7768
                                                    252/301.4 F
5,915,285 A    6/1999 Sommer
(Continued)

FOREIGN PATENT DOCUMENTS

CN        101054267 B     9/2010
WO        96/07487 A1     3/1996
(Continued)

OTHER PUBLICATIONS

Goebbert et al. "Wet chemical deposition of ATO and ITO coatings using crystalline nanoparticles redispersable in solutions" Aug. 1999).*
(Continued)

*Primary Examiner* — Austin Murata
(74) *Attorney, Agent, or Firm* — Im IP Law; C. Andrew Im; Chai Im

(57) ABSTRACT

A method for manufacturing a transparent tactile surface. The nanoparticles, particularly of ITO, are incorporated in an aqueous solution containing a stabilizing agent. The water suspension including the nanoparticles are subjected to ultrasound. The nanoparticles in aqueous suspension with a ligand are incubated that can attach to the surface of the nanoparticles through a covalent bond. The nanoparticles with the surface modified by the ligand in the form of a
(Continued)

colloidal suspension are deposited on a transparent substrate.

10 Claims, 3 Drawing Sheets

(51) Int. Cl.
    *B82Y 10/00*         (2011.01)
    *B82Y 15/00*         (2011.01)
    *B82Y 30/00*         (2011.01)
    *G06F 3/041*         (2006.01)
    *B82Y 40/00*         (2011.01)
    *B05D 1/18*          (2006.01)
    *B05D 3/00*          (2006.01)

(52) U.S. Cl.
    CPC .............. *B82Y 15/00* (2013.01); *B82Y 30/00* (2013.01); *B82Y 40/00* (2013.01); *G06F 3/0414* (2013.01); *G06F 2203/04103* (2013.01); *Y10T 428/24364* (2015.01)

(56) References Cited

U.S. PATENT DOCUMENTS

| | | | | |
|---|---|---|---|---|
| 2005/0064204 A1* | 3/2005 | Lalli | ............... | B82Y 30/00 428/428 |
| 2005/0250244 A1* | 11/2005 | Li | ............... | H01L 51/0023 438/99 |
| 2007/0048519 A1* | 3/2007 | Anderson | ............... | B32B 17/10 428/323 |
| 2009/0322704 A1* | 12/2009 | Anno | ............... | G06F 3/044 345/174 |
| 2010/0051917 A1* | 3/2010 | Kippelen | ............ | H01L 51/0537 257/40 |
| 2010/0140548 A1* | 6/2010 | Zhao | ............... | B22F 1/0018 252/301.4 R |
| 2011/0036269 A1* | 2/2011 | Hill | ............... | C01G 15/00 106/287.19 |
| 2011/0097543 A1* | 4/2011 | Lalli | ............... | B82Y 30/00 428/141 |
| 2011/0227836 A1 | 9/2011 | Li et al. | | |
| 2013/0025672 A1* | 1/2013 | Auvray | ............... | C03C 17/3435 136/256 |
| 2013/0101813 A1* | 4/2013 | Nakajima | ............... | C09C 1/62 428/207 |

FOREIGN PATENT DOCUMENTS

| WO | WO2011/101572 | * | 8/2011 |
| WO | WO 2011/136215 | * | 11/2011 |
| WO | 2012/016945 A1 | | 2/2012 |

OTHER PUBLICATIONS

Al-Dahoudi et al, "Wet Coating Deposition of ITO Coatings on Plastic Substrates", Journal of Sol-Gel Science and Technology, Jan. 1, 2003, pp. 693-697, vol. 26, No. 1/3, Kluwer Academic Publishers, The Netherlands.

Goebbert et al, "Wet chemical deposition of ATO and ITO coatings using crystalline nanoparticles redispersable in solutions", Thin Solid Films, Aug. 30, 1999, pp. 79-84, vol. 351, No. 1-2, Elsevier-Sequoia S. A. Lausanne, CH.

* cited by examiner

METHOD OF MANUFACTURING A TRANSPARENT TACTILE SURFACE AND TACTILE SURFACE OBTAINED BY SUCH A METHOD

RELATED APPLICATIONS

This application is a § 371 application from PCT/EP2013/065857 filed Jul. 28, 2013, which claims priority from French Patent Application No. 12 57340 filed Jul. 27, 2012, each of which is herein incorporated by reference in its entirety.

TECHNICAL FIELD OF THE INVENTION

The invention relates to a method for manufacturing a transparent tactile surface and a tactile surface obtained by such a method. The method according to the invention is particularly but not exclusively suitable for manufacturing a soft or hard tactile screen, designed in particular for an electronic device such as a computer, an electronic tablet or a telephone. The method according to the invention is also suitable for making a glass or a transparent wall with functions. Throughout the text, the words 'transparent' and 'translucent' are considered to be equivalent.

BACKGROUND OF THE INVENTION

The document U.S. Pat. No. 5,915,285 describes a method for making a strain gauge for a transparent surface. This method of the prior art uses the piezoresistive property of indium tin oxide ($In_2O_3$—$SnO_2$) or ITO, a transparent material that is deposited in the form of a thin layer on a substrate that makes up the surface to be functionalized. When said substrate is deformed, the thin layer of ITO is subjected to strain and its resistivity is modified. Thus, by measuring the variation in resistivity of said coating, the strain on the substrate can be detected. The piezoresistive effect of the ITO layer is measurable but corresponds to low resistivity variations. That resistivity variation depending on the strain defines gain, commonly known by the term of 'gauge factor'. Thus, the gauge factor of a strain sensor that uses the piezoresistive effect of ITO is low, and precise detection of the mode of strain on the substrate makes it necessary to use measurement techniques and equipment whose cost is not compatible with that of devices intended for the general public.

The document WO 2012 016945 filed by the applicant describes the making of a tactile surface using conductive nanoparticles deposited in the form of an assembly of nanoparticles in colloidal suspension on said surface, particularly using a capillary/convective depositing method. The variation in conductivity of the assembly of nanoparticles under the effect of strain, which variation is attributed to conduction by tunnel effect between the nanoparticles of the assembly without being bound by any theory, makes it possible to obtain a gauge factor for the strain sensor made up in that manner that is much larger than what can be achieved using the piezoresistive effect. However, the making of such a strain sensor from nanoparticles of ITO or from other transparent nanoparticles available in the market does not provide satisfactory results. Firstly, the electrical conductivity of nanoparticles of ITO is too low to bring out the tunnel effect conduction mechanism sought by this type of gauge. Secondly, ITO nanoparticles are available in the market in the form of nanopowder, in which the size of the nanoparticles is very dispersed. The applicant has identified that the gauge factor obtained for a strain sensor as described in the document WO 2012 016945 is directly related to the homogeneity of the size of the nanoparticles contained in it. Besides, the introduction of nanopowder into a liquid phase in order to make the colloidal suspension leads to the formation of nanoparticle clusters, which further increase the dispersion of the size of the nanoparticles in the assembly. Finally, the capillary/convective depositing technique, which is industrially well adapted, also requires the suspension of nanoparticles that are homogeneous in size and sufficiently small. For example, the sensors described in the document WO 2012 016945 are made from mono-dispersed gold nanoparticles with a mean diameter of 15 nm ($15\times10^{-9}$ meter); this type of colloidal solution is commonly available in the market.

OBJECT AND SUMMARY OF THE INVENTION

The invention aims to remedy the drawbacks of the prior art and therefore relates to a method for manufacturing a transparent tactile surface, which method comprises the steps consisting in:
a. incorporating transparent nanoparticles, particularly of ITO, in an aqueous solution comprising a stabilizing agent;
b. subjecting said aqueous solution comprising the nanoparticles to ultrasound;
c. incubating the nanoparticles in aqueous suspension with a ligand that can attach to the surface of said nanoparticles through a covalent bond;
d. depositing the nanoparticles the surface of which was modified by the ligand in step (c) in the form of a colloidal suspension on a transparent substrate.

Thus, the ultrasound can break the clusters of nanoparticles while allowing the stabilizing agent to be adsorbed in a non-specific manner with the nanoparticles dispersed in that manner. The ligand attaches to the nanoparticles in covalent manner, and so the chemical structure of the ligand molecule is responsible for conduction via the tunnel effect between the nanoparticles, which makes it possible to make a strain gauge from weakly conductive nanoparticles. That covalent bond between the ligand and the surface of the nanoparticles is stronger than the adsorption bond of the stabilizing agent and makes it possible to functionalize the surface of the suspended nanoparticles by incubation, as the ligand takes the place of the stabilizing agent. Thus, the nanoparticles, the modification of the surface of which makes them capable of producing a tunnel effect or any other conduction effect suitable for producing a high gauge factor, are stable and dispersed in the solution and can be deposited on the surface of the substrate under the control of different methods, particularly the capillary/convective depositing method.

The term 'adsorption' refers to the fixing of free molecules of a substance on the surface of a body.

The invention can be implemented advantageously in the embodiments described below, which may be considered individually or in any technically operative combination.

Advantageously, the method according to the invention comprises between steps (b) and (c) the steps consisting in:
e. decanting the aqueous suspension;
f. separating and removing excessively large clusters of nanoparticles from said suspension.

This alternative method makes it possible to obtain an even more homogeneous distribution of nanoparticles in the aqueous solution.

In an advantageous embodiment, the stabilizing agent is polyoxyethylene sorbitan monolaurate.

Advantageously, the ligand is of the type capable of creating metal-O—P bonds with the surface of nanoparticles, preferably an (aminomethyl) phosphonic acid. ($CH_6NO_3P$). That is because phosphonic acid has very strong affinity, particularly with ITO particles, and further, it favors the dispersion of nanoparticles thus improving the stability of the solution during capillary/convective depositing.

In an exemplary embodiment of the method according to the invention, the colloidal suspension obtained in step (f) comprising clusters of nanoparticles with a controlled diameter. Thus, the method according to the invention advantageously uses clusters of nanoparticles that are of uniform size in order to carry out the process cost-effectively, and also obtain a higher gauge factor.

Advantageously, the mean diameter of the clusters is about 100 nm ($100 \times 10^{-9}$ meter). That cluster dimension makes it possible to carry out the colloidal suspension cost-effectively, while retaining the capillary/convective depositing capacity of said suspension.

In one advantageous embodiment, the method according to the invention comprises, before step (d), a step consisting in:

g. modifying the surface of the substrate by attaching a chemical linker on said surface.

Thus, the linker creates a strong bond between the assembly of nanoparticles and the substrate, to allow the subsequent technological steps and make the assembly resistant to humidity.

In one particular alternative of the previous embodiment, the chemical linker deposited on the surface of the substrate during the step (g) is deposited along a definite geometric pattern. Thus, the assembly of nanoparticles deposited on the substrate is structured along the pattern sought by rinsing.

Advantageously, the method according to the invention comprises, after step (d), in the embodiment including the attachment of a linker on the surface of the substrate, a step consisting in:

h. creating a passivating layer above the assembly of nanoparticles deposited in step (d).

Thus, the sensitivity of the device to exterior humidity and to those humidity variations is low. The passivating layer also insulates the assembly of nanoparticles electrically.

Advantageously, the passivating layer is made of silicon dioxide ($SiO_2$). That hard passivating layer makes it possible to protect the tactile surface obtained by the method according to the invention from abrasion.

Alternatively, the passivating layer is made of silicon nitride ($Si_3N_4$).

In an alternative embodiment, the passivating layer is made of a polyimide. This embodiment makes it possible to obtain a flexible tactile surface.

Advantageously, in its version including the attachment of a linker on the surface of the substrate, the method according to the invention comprises, before step (h), a step consisting in:

i. creating an array of electrodes on the assembly of nanoparticles.

Thus, the different connection systems can be applied on the same assembly of nanoparticles so as to obtain different strain or stress measurements.

In a first embodiment of step (d) of the method according to the invention, the colloidal suspension is deposited on the surface of the substrate during said step (d) using a capillary/convective depositing method. This method is industrially well controlled and the preparation of colloidal suspension according to the method of the invention makes it possible to keep it under control to guarantee the quality of the result obtained.

In a second embodiment of step (d) of the method according to the invention, the colloidal suspension is deposited during said step (d) by immersing the substrate in said suspension and the method comprises, after step (d), a step consisting in:

j. rinsing the substrate with solvent capable of eliminating the nanoparticles that are not bonded by the chemical linker.

This embodiment allows high productivity rates.

In a third embodiment of step (d) of the method according to the invention, said step (d) comprises the steps consisting in:

di. depositing a drop of a colloidal suspension comprising nanoparticles on the surface of the substrate;

dii. evaporating said drop.

This embodiment provides a compromise between productivity and quantity of nanoparticles used for carrying out step (d). Further, this embodiment is less sensitive to the size of the nanoparticles in the colloidal suspension than the technique of capillary/convective depositing and turns out to be particularly suitable for depositing such a suspension comprising ITO nanoparticles, particularly in the form of clusters.

Advantageously, the drop evaporation step is carried out by heating the substrate. Thus, the depositing process is accelerated further.

The invention also relates to a transparent tactile surface, which comprises a strain gauge comprising an assembly of nanoparticles, which gauge is obtained using the method according to the invention. Thus, said tactile surfaces is used to measure the force applied to it or the strain put on it.

In one embodiment of the tactile surface according to the invention, the surface comprises a substrate made of polyethylene terephthalate. This embodiment is suitable for making a flexible tactile surface.

In another embodiment, the tactile surface according to the invention comprises a substrate made of silicon dioxide. This embodiment is suitable for a hard tactile surface.

Advantageously, the tactile surface according to the invention comprises an array of electrodes comprising two sets of electrodes in a nested comb arrangement. Thus, with the same depositing pattern of the assembly of nanoparticles on the substrate and the same number of electrodes deposited, a larger number of elementary gauges can be created.

BRIEF DESCRIPTION OF THE DRAWINGS

The invention is described below in its preferred embodiments, which are not limitative in any way, and by reference to FIGS. 1 to 7, wherein.

DETAILED DESCRIPTION OF THE EMBODIMENTS

Figure 1:
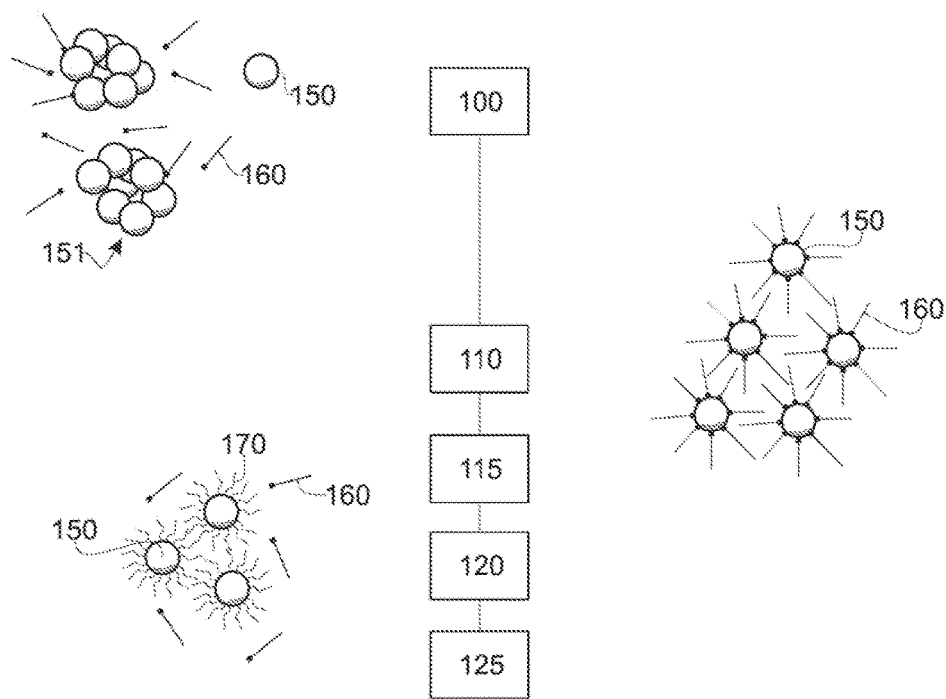
FIG. 1 is a chart of the preparation of an aqueous solution comprising a dispersion of nanoparticles, suitable for capillary/convective depositing, from a nanopowder, according to the method of the invention.

In FIG. 1 of an exemplary embodiment of the method according to the invention relating to the preparation of the water dispersion, said method comprises a first step (100) consisting in incorporating, in an aqueous solution comprising a stabilizing agent (160), nanoparticles (150) in the form of a nanopowder. Said nanoparticles are made of a transparent or translucent material. As non-limitative examples, said particles are made of zinc oxide (ZnO) or tin-doped indium oxide ($In_2O_3$—$SnO_2$), or ITO. The nanopowder comprises clusters (151) of nanoparticles. In one exemplary embodiment, the stabilizing agent is polyoxyethylene sorbitan monolaurate, available in the market under the name "Tween-20". During a homogenizing step (110), the aqueous solution in which the nanopowder is incorporated during the previous step (100) is submitted to agitation by ultrasound at a power sufficient to break up the clusters of nanoparticles, thus allowing the molecules (160) of the stabilizing agent to be adsorbed in a non-specific way by the nanoparticles thus dispersed. An optional decantation phase (115) makes it possible to separate excessively large clusters from the sedimentation. Thus the aqueous solution comprises a dispersion of clusters of nanoparticles of homogeneous size of about 100 nm ($100 \times 10^{-9}$ meter). During a functionalization stage (120), a ligand is mixed with the aqueous solution which is incubated for a time of about 12 hours at ambient temperature; those parameters are adjusted according to the nature of the ligand. In a preferred embodiment, the ligand is an (aminomethyl) phosphonic acid. In those conditions, the ligand (170) interacts strongly with the nanoparticles (150) and attaches to them in a covalent manner, taking the place of the molecules of the stabilizing agent (160) which is bonded only by adsorption with said nanoparticles. The stabilizing agent is removed from the aqueous solution during a rinsing step (125) consisting in a series of rinsing operations with water. The aqueous solution is thus ready to be deposited by capillary/convective depositing or using other methods.

Figure 2:
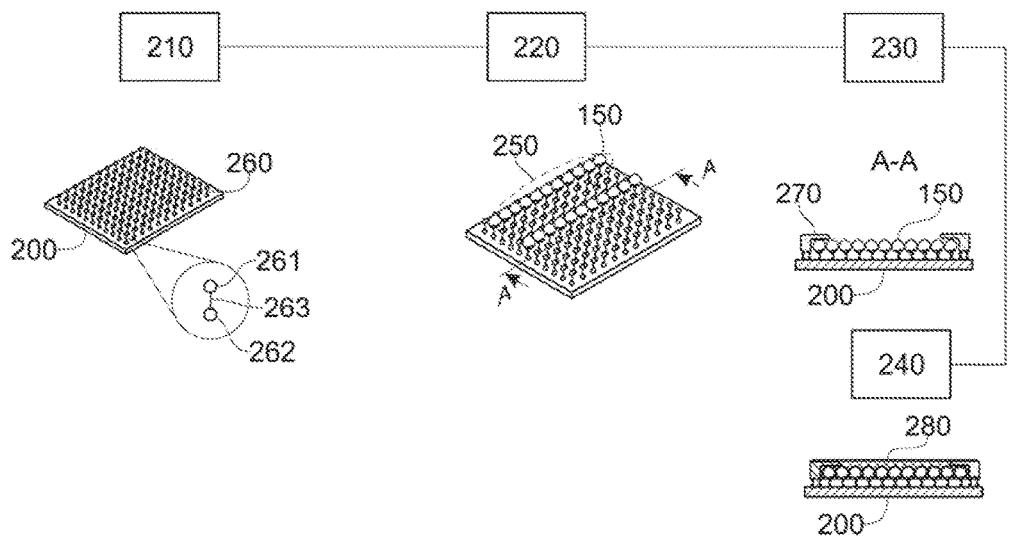
FIG. 2 is a chart of the preparation of a substrate and the depositing on said substrate of an assembly of nanoparticles according to the method of the invention.

In FIG. 2, in parallel with the preparation of the aqueous solution for depositing, the surface of the substrate designed to receive the depositing of the assembly of nanoparticles is prepared. During an attachment step (210), a linker (260) is attached at the surface of the substrate (200). Said substrate is made up of transparent or translucent material. As a non-limitative example, the substrate is made of polyethylene terephthalate or PET, in order to create a soft tactile surface. In another exemplary embodiment, the substrate (200) is made of silicon dioxide ($SiO_2$), in order to create a rigid tactile surface. In yet another exemplary embodiment, the soft substrate is glued to a rigid support. The linker (260) consists in a molecule made up of a bond chain (263), for example a carbon chain, and two distinct chemical functions (261, 262) at the ends of the bond chain. One of the two chemical functions is used to attach the linker (260) on the surface of the substrate (200), and the other to attach said linker on the surface of the nanoparticles.

As a non-limitative example, the chemical linker for an SiO2 or PET substrate is a silane ($SiH_4$), capable of interacting with OH groups of the surface of the substrate that is first activated by UV-Ozone treatment and comprising at the other end (261) of the linker a carboxylic group (COOH) capable of being attached to an amino group ($NH_2$) first attached on the surface of the nanoparticles.

The attachment operation (210) of said linker (260) on the surface of the substrate is for example carried out by immersion. In a particular embodiment, the linker is attached at the surface of the substrate by a micro-printing method such as soft lithography in order to deposit said linker in a definite pattern.

During the depositing step (220), the assembly of nanoparticles (150) in colloidal suspension is deposited on the surface of the substrate attached by the linker. In one exemplary embodiment, depositing is carried out by a capillary/convective depositing technique using a determined geometric pattern, for example in the form of nanoparticle fibers (250). In an embodiment of the method according to the invention, the pattern is obtained by controlling the convective depositing parameters. In another embodiment, the depositing pattern of the assembly of nanoparticles is the reproduction of the attachment pattern of the linker. That is because the linker sticks the nanoparticles on the surface of the substrate permanently. Thus, by immersing the substrate in the colloidal suspension, the nanoparticles are stuck in the pattern corresponding to the micro-printing pattern of the linker on the surface of the substrate. The nanoparticles that are located outside the pattern of the linker are eliminated from the surface by rinsing. Thus, this embodiment makes it possible to obtain an assembly of nanoparticles organized in a pattern, using a depositing method of said assembly by immersion.

Figure 7:
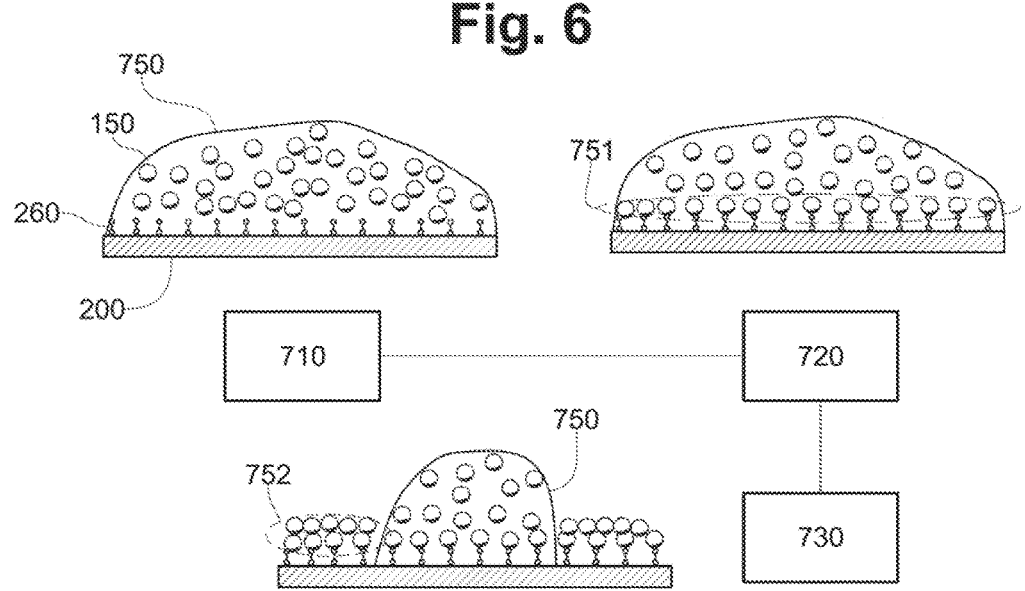
FIG. 7 is a synopsis of a method for depositing the colloidal suspension on the substrate through the evaporation of a drop, in a sectional view.

In FIG. 7 according to another embodiment, the assembly of nanoparticles is deposited in a colloidal suspension on the surface of the substrate in the form of a drop. Thus, in a first step (710) of the method, a drop (750) comprising nanoparticles (150) in a colloidal suspension is deposited on the surface of the substrate (200), which surface has first been attached by a chemical linker (260). Because of the chemical affinity of the nanoparticles with the chemical linker, naturally, in a second step (720) of the method, a single coat (751) of nanoparticles is attached to the chemical linkers at the surface of the substrate. During an evaporation step (730), the evaporation of the drop from its center leads to a movement of the edges of said drop to its center, leading to the depositing of nanoparticles. Such depositing is organized (752) on the first single coat (751) that remains attached to the substrate by the chemical linker. The technique makes it possible to carry out depositing with structures comparable to those that can be achieved through capillary/convective depositing while benefiting from greater productivity, and it also makes it possible to reduce the quantity of nanoparticles deposited in the suspension for the same result, as all the nanoparticles (150) contained in the drop (750) are used. Thus, the depositing time is reduced to a few minutes compared to a few hours using the capillary/convective depositing method of the prior art and the quantity of nanoparticles used is reduced by a factor 10, for equivalent functionality, when compared to deposition techniques of the prior art. Besides, the method is compatible with existing micro-printing methods. Further, this depositing method is far less sensitive to the size of the nanoparticles and is particularly suited for depositing a colloidal suspension including clusters of nanoparticles. In one exemplary embodiment (not shown), appropriate means are used to heat the substrate (200) after the drop (750) has been deposited on said substrate so as to speed up the evaporation of said drop (750).

Returning to FIG. 2, during a step (230) of creation of the circuit, electrodes (270) for the electrical connection of the assembly of nanoparticles are made using lithography techniques. As an example, transparent electrodes are made up of a deposit of ITO, deposited by photolithography or soft lithography.

During a passivating step (240), a passivating layer (280) is deposited on the whole. That transparent layer, which may be organic or ceramic, protects the assembly of nanoparticles and the device using the assembly of nanoparticles from external attacks. Said passivating layer (280) is sized according to the material making it up, so that it allows the transmission of mechanical strain to the assembly of nanoparticles. As non-limitative examples, the passivation layer is made up of polyimide, silicon dioxide ($SiO_2$) or silicon nitride ($Si_3N_4$).

Figure 3:
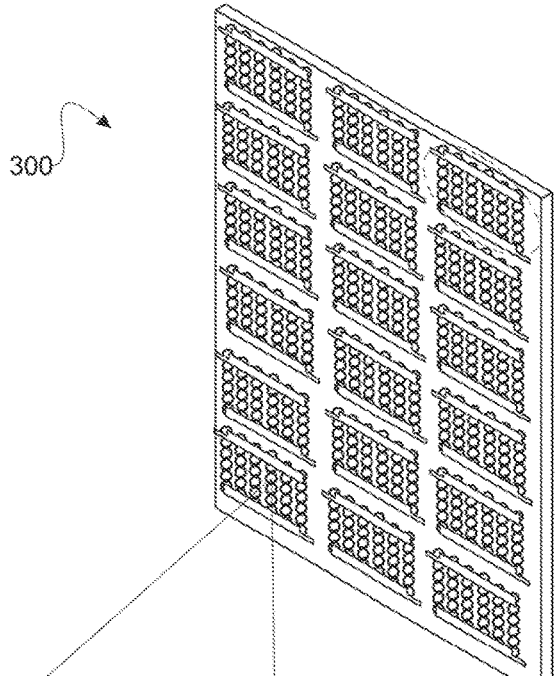
FIG. 3 is a perspective view of an exemplary embodiment of a tactile surface according to the invention.

In FIG. 3, according to an exemplary embodiment, the tactile surface (300) according to the invention comprises a plurality of sensors (310) consisting in a plurality of assemblies of nanoparticles connected by electrodes in a definite pattern. Each sensor is made by the method according to the invention and makes up a series of elementary strain gauges that can measure the intensity and direction of a force applied on said sensor.

Figure 4:
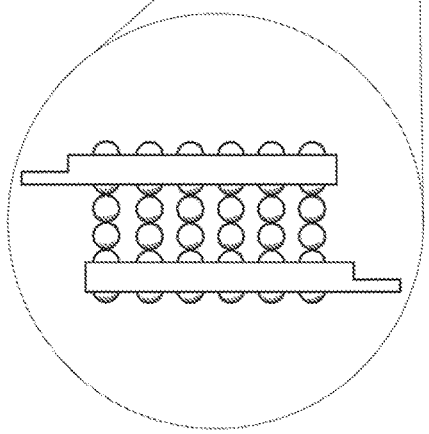
FIG. 4 is a detailed top view of a tactile surface sensor of FIG. 3, said sensor comprising an assembly of nanoparticles.

In FIG. 4 of the exemplary embodiment of the tactile surface of FIG. 3, each sensor (310) comprises an assembly of nanoparticles (150) organized in a definite pattern, for example nanoparticle fibers, connected by electrodes (471, 472). The arrangement pattern of the nanoparticles in the assembly and the pattern of connection of those arrangements by the electrodes (471, 472) cooperate to determine the sensitivity of each sensor to each component of the force torsor applied to it.

Figure 5:
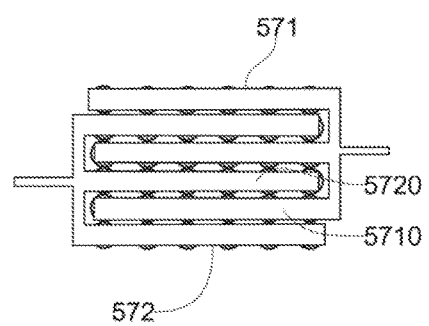
FIG. 5 is a top view of an exemplary embodiment of a tactile surface sensor, which sensor comprises an array of electrodes in a comb arrangement.

In FIG. 5, according to an exemplary embodiment of the tactile surface according to the invention, the electrodes of a sensor (310) of said tactile surface are organized in an array of electrodes (571, 572) in nested comb arrangements, known as interdigitated arrangements. This embodiment makes it possible, with the same gauge functionality and the same quantity of nanoparticles deposited on the substrate, to make a more compact device. Thus, according to this exemplary embodiment, each tooth (5710) of a comb arrangement (571) juxtaposed with another tooth (5720) of the other arrangement (572) defines an elementary gauge between said teeth. Said elementary gauge is the locus of electrical conduction by tunnel effect between the nanoparticles of the assembly located between the electrodes demarcating said gauge. That phenomenon of conduction by tunnel effect depends on the chemical nature of the ligand, and when the bond between the ligand and the surface of the nanoparticles is covalent, as for example a metal-O—P bond in the case of a phosphonic acid ligand with ITO nanoparticles, then the length of the ligand molecule has little influence on conduction by tunnel effect between the nanoparticles.

Figure 6:
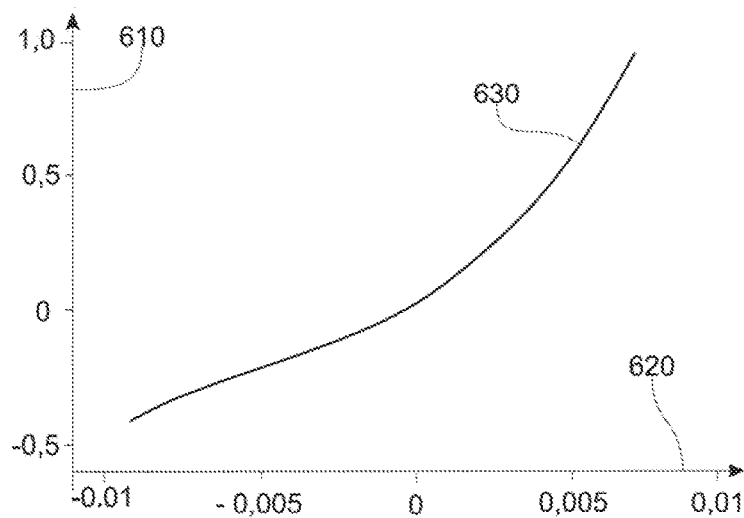
FIG. 6 is an example of the variation of the resistance of a strain sensor made according to the method of the invention, depending on the strain put on said sensor.

In FIG. 6, the use of the variation in conduction by tunnel effect makes it possible to make a very sensitive strain gauge. For example, the plot (630) of the proportional variation ($\Delta R/R0$) of the resistance (610) of an elementary gauge made up of an assembly of ITO nanoparticles with an attached phosphonic acid ligand, obtained using the method according to the invention, shows an exponential change in the response depending on the strain (620) sustained by said elementary gauge. In this exemplary embodiment, the gauge factor reaches the value of 85 on the explored strain range from −1% for compression to 1% pulling strain with resistance R0 of $2430.10^3$ Ohm in the absence of strain.

The description above and the exemplary embodiments show that the invention achieves the objectives sought. In particular, the method according to the invention makes it possible to create a transparent tactile surface in a cost-effective manner by using transparent nanoparticles, particularly of ITO, and a special ligand to obtain very sensitive elementary gauges. The use of a chemical linker makes it possible to deposit such an elementary gauge on any type of surface, hard or flexible, and to protect the deposit with a passivating layer. Other alternatives that are not illustrated may be used, particularly the electrodes may be deposited on the assembly of nanoparticles, between said assembly and the substrate.

The invention claimed is:

1. A method for manufacturing a transparent tactile surface, comprising the steps of:
   incorporating indium tin oxide type nanoparticles in an aqueous solution comprising a stabilizing agent;
   subjecting the aqueous solution comprising the nanoparticles to ultrasound;
   decanting the aqueous solution, separating and removing clusters of the nanoparticles that are larger than other clusters of the nanoparticles from the aqueous solution;
   incubating the nanoparticles in an aqueous suspension with a ligand that can attach to a surface of the nanoparticles through a covalent metal-O—P bond with the surface of the nanoparticles;
   modifying a surface of a transparent substrate by attaching a chemical linker on the surface of the transparent substrate according to a definite geometric pattern;
   depositing the nanoparticles with the surface modified by the ligand in a form of a colloidal suspension on the transparent substrate with the modified surface;
   forming an array of electrodes on an assembly of the nanoparticles; and
   forming a passivating layer above the assembly of the nanoparticles deposited on the transparent substrate to form the transparent tactile surface comprising a sensor made with the assembly of nanoparticles in a form of a strain gauge configured to measure an intensity and a direction of a force applied to the sensor.

2. The method according to claim 1, wherein the stabilizing agent is polyoxyethylene sorbitan monolaurate.

3. The method according to claim 1, wherein the ligand is an aminomethylphosphonic acid.

4. The method according to claim 1, wherein the colloidal suspension comprises clusters of nanoparticles with a controlled diameter.

5. The method according to claim 4, wherein a mean diameter of the clusters is 100 nm or $100 \times 10^{-9}$ meter.

6. The method according to claim 1, wherein the passivating layer is made of one of the following: silicon dioxide ($SiO_2$), silicon nitride ($Si_3N_4$) or a polyimide.

7. The method according to claim 1, further comprising the step of depositing the colloidal suspension on a surface of the transparent substrate by a capillary/convective deposition.

8. The method according to claim 1, further comprising the steps of immersing the transparent substrate in the colloidal suspension; and rinsing the transparent substrate with a solvent that eliminates the nanoparticles that are not bonded by the chemical linker.

9. The method according to claim 1, further comprising the steps of depositing a drop of a colloidal suspension comprising nanoparticles on the surface of the transparent substrate; and evaporating said drop.

10. The method according to claim 9, further comprising the step of heating the transparent substrate to evaporate said drop.

\* \* \* \* \*